United States Patent [19]

Eidenböck et al.

[11] Patent Number: 5,716,145
[45] Date of Patent: Feb. 10, 1998

[54] PROCESS FOR FRACTURE SEPARATING THE BEARING COVER OF A MULTI-PART BEARING ARRANGEMENT, PARTICULARLY, IN CRANKCASES OF INTERNAL-COMBUSTION ENGINES

[75] Inventors: Thomas Eidenböck, Steyr; Christian Landerl, Ulmerfeld-Hausmering; Franz Malischew, Steyr, all of Austria; Clemens Luchner, München, Germany

[73] Assignee: Bayerische Motoren Werke Aktiengesellschaft, Munich, Germany

[21] Appl. No.: 553,672
[22] PCT Filed: Feb. 3, 1995
[86] PCT No.: PCT/EP95/00400
 § 371 Date: Apr. 30, 1996
 § 102(e) Date: Apr. 30, 1996
[87] PCT Pub. No.: WO95/28573
 PCT Pub. Date: Oct. 26, 1995

[30] Foreign Application Priority Data

Apr. 16, 1994 [DE] Germany .................. 44 13 255.7

[51] Int. Cl.⁶ .................. F16C 17/02; F16C 43/02
[52] U.S. Cl. .................. 384/434; 29/898.12
[58] Field of Search .................. 384/434, 294, 384/432, 503; 29/898.12, 898.09

[56] References Cited

U.S. PATENT DOCUMENTS 3,464,746 9/1969 Weber .
4,125,637 11/1978 Tanner .................. 29/898.12
4,523,365 6/1985 Richmond .................. 29/898.12
4,684,267 8/1987 Fetouh .
4,693,139 9/1987 Mukai et al. .
5,105,538 4/1992 Hoag et al. .
5,274,919 1/1994 Becker .

FOREIGN PATENT DOCUMENTS 1218213 6/1966 Germany .
WO87/06509 11/1987 WIPO .

*Primary Examiner*—Lenard A. Footland
*Attorney, Agent, or Firm*—Evenson McKeown Edwards & Lenahan, PLLC

[57] ABSTRACT

For a process for fracture separating the bearing cover of a multi-part bearing arrangement, particularly in crankcases of internal-combustion engines, by means of a half-mandrel in a bearing bore partially bounded by the bearing cover, for separating integrally constructed fastening flanges of the bearing cover from the remaining part of the bearing arrangement, it is suggested for producing fracture separating surfaces in planes sloping with respect to one another that the pairs of corresponding fracture separating surfaces of the bearing cover and the remaining part of the bearing arrangement are produced in separating areas which together enclose an obtuse angle ($\alpha$) having a case-side vertex by at least one half-mandrel whose curvature radius, as a function of the respective obtuse angle ($\alpha$), is selected to be by 0.5% to 5% smaller than the constant radius of the bore receiving the half-mandrel.

14 Claims, 1 Drawing Sheet

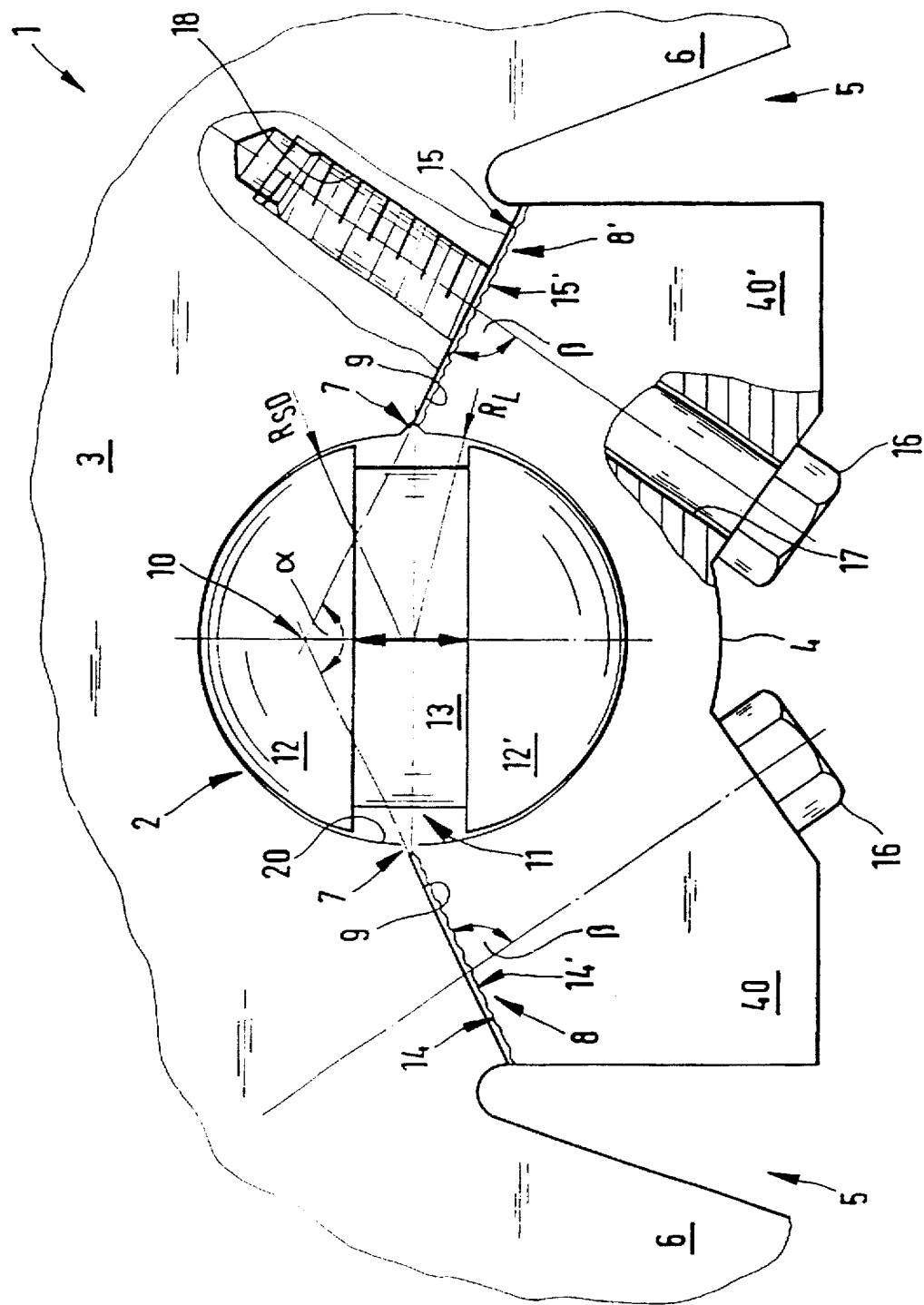

PROCESS FOR FRACTURE SEPARATING THE BEARING COVER OF A MULTI-PART BEARING ARRANGEMENT, PARTICULARLY, IN CRANKCASES OF INTERNAL-COMBUSTION ENGINES

BACKGROUND AND SUMMARY OF THE INVENTION

This invention is based on the preamble of Claim 1 of U.S. Pat. No. 4,684,267.

That document describes a process for fracture separating the bearing cover of a multi-part bearing arrangement in an engine unit of an internal-combustion engine, in which case an embodiment where the fracture separating surfaces of the bearing cover and the engine unit, which correspond in pairs in an accurately fitting manner, are situated essentially in a common plane.

From U.S. Pat. No. 1,916,292, a multi-part bearing arrangement is known for a crankcase having cylinders arranged in a V-shape, in which the bearing cover and the engine unit are braced with respect to one another by way of machined cut contact surfaces. The contact surfaces, which correspond in pairs by means of smooth surfaces, are arranged in planes which together enclose an obtuse angle, for reducing the stressing of the crankshaft bearing cover.

It is an object of the invention to further develop the fracture separating process of the above-mentioned type in that also fracture separating surfaces which extend in a sloped manner with respect to one another can be achieved in arbitrary bearing arrangements, preferably for crankcases having cylinders arranged in a V-shape.

This object is achieved by the arrangement of Claim 1. The invention advantageously permits, in the case of a crankcase having cylinders arranged in a V-shape and integrally molded-on bearing covers, their fracture separating from the crankcase with fracture separating surfaces which extend essentially in planes sloped with respect to one another at an obtuse angle. Optionally, as far as its size is concerned, the obtuse angle may correspond to the supplementary angle of the V-angle between the cylinders. By means of separating areas between the engine unit and the bearing cover prepared according to the invention at a predetermined obtuse angle $\alpha$, fracture separating surfaces are reliably achieved which extend in a correspondingly sloped manner by means of, in addition, designing the half-mandrel according to the invention with a curvature radius reduced with respect to the receiving bearing bore by 0.5% to 5%. The design of the half-mandrel according to the invention, during the fracture separating operation, results in an elastic deformation of the bearing cover which favorably influences the course of the fracture separating in the direction of the separating areas arranged at an obtuse angle.

The curvature radius of the half-mandrel may have a constant value; however, it may also be selected to be variable for achieving a partially elliptic cross-section for the half-mandrel.

In a first embodiment of the fracture separating process, another, preferably identical half-mandrel is assigned to the half-mandrel for fracture separating the bearing cover in the bearing bore by means of a separating wedge, and a fracture separating force is generated in the bearing bore by means of the thus formed expanding mandrel.

In a further development of the process according to the invention, a particularly simple construction of the separating areas takes place by means of steps created by a removal of material at least on one end face side of the bearing arrangement. These steps form a cross-sectional discontinuity in the bearing arrangement which ensures, in combination with the curvature radius of the half-mandrel selected according to the invention, that fracture separating surfaces are obtained in planes which are sloped with respect to one another at an obtuse angle. When the obtuse angle $\alpha$ is selected to be large, the curvature radius of the half-mandrel is preferably selected to be by 0.5% to 1.5% smaller than the constant curvature radius of the bearing bore receiving the half-mandrel.

Within the scope of the further development according to the invention, a bearing cover of the bearing arrangement may be machined simultaneously on both end face sides by means of a set of disk milling cutters. The diameters of these cutters may be selected to be, for example, so large that the curved steps produced by means of them, on the average, enclose an obtuse angle.

According to another suggestion, the separating areas may also be prepared by groove-type indentations arranged at least on one end face side of the bearing arrangement.

The above-described constructions of the separating areas apply to bearing arrangements made of an iron material, particularly for bearing arrangements in engine units or crankcases made of a cast-iron material. In the case of a bearing arrangement made of a light-metal alloy, the separating area may be prepared alone or in addition to the above-mentioned measures by means of a fiber insert. The process is also conceivable for bearing arrangements of connecting rods.

In another embodiment of the process, the bearing-cover-side half-mandrel may be connected with a device arranged outside the bearing arrangement, for the step-by-step effect of a prestressing force and of a fracture separating force.

Another suggestion relates to the fixing of the bearing cover by means of screw bolts in such a manner that, by means of these screw bolts, pushing forces are achieved in the mutually braced fracture separating surfaces which counteract effective pushing forces of the engine unit. This arrangement is known per se for smooth free-cut contact surfaces of the bearing cover and the crankcase for a V-engine from German Patent Document DE-B 17 50 595. The application of this known screw arrangement in the case of a bearing cover fracture-separated from an engine unit advantageously prevents damage to the fracture structure of the fracture separating surfaces causing a fit of the corresponding fracture separating surfaces which may be caused by dynamic transverse stress. This results in a high operational reliability of the bearing cover arrangement.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view, taken in a radial plane of a bearing bore, showing a bearing arrangement separation process according to preferred embodiments of the present invention.

DETAILED DESCRIPTION OF THE DRAWINGS

A crankcase 1 of a V-engine, which is not shown in detail, has a bearing arrangement 2 with a bearing bore 20 for a crankshaft which is not shown, which bearing bore 20 is arranged proportionately in a bearing block 3 and a bearing cover 4. The crankcase 1 is constructed as a casting with a cast-on bearing cover 4. The bearing cover 4 is limited in its length by way of the bearing block 3 by clearances 5 with respect to adjacent sections 6 of the bearing block 3 or the crankcase 1 produced by casting or free-cutting machining. After a free-cutting premachining of the bearing bore 20, including the arrangement of V-shaped notches 7 in the diametrical position, in the transition from the crankcase 1 or bearing block 3 to the integral bearing cover 4, separating areas 8, 8' are prepared between the bearing bore 2 and the fastening flanges 40, 40' of the bearing cover 4 determined essentially by the clearances 5, for the fracture separating of the bearing cover 4 from the crankcase 1 or from the bearing block 3. The preparation of the separating areas 8, 8' according to the process comprises cross-sectional changes between the adjacent components and/or a treatment of the material which promotes the fracture separating.

In the case of a crankcase 1 made of a cast-iron material, the separating areas 8, 8' are preferably prepared by cross-sectional changes. The process is carried out advantageously in that the bearing arrangement 2 is machined in a material-removing manner on both end face sides by means of a set of disk milling cutters. By means of the disk milling cutters, which have the same diameters, the bearing cover 4 is set off by way of steps 9 with respect to the bearing block 3, for achieving cross-sectional discontinuities for controlling the course of the fracture between the bearing block 3 and the bearing cover 4. For triggering the fracture in a targeted manner in the cross-sectional discontinuities provided by the steps 9, the steps 9 end in the V-shaped notches 7 of the bearing bore 20. For weakening the cross-section, groove-type indentations in the end face sides of the bearing arrangement 2 between the bearing block 3 and the bearing cover 4 are also conceivable instead of the steps 9. Further, for controlling the course of the fracture, the material of the crankcase 1 may, in addition, be embrittled in the separating areas 8, 8'.

As illustrated in the single figure, the steps 9 of the separating areas 8, 8' together enclose an obtuse angle $\alpha$ with a case-side vertex 10. The steps 9 may be constructed to extend in a straight line or may be slightly curved which can be achieved, for example, by means of a set of disk milling cutters of a large radius. For fracture separating the bearing cover 4 from the bearing block 3, a divided expanding mandrel 11 is introduced into the bearing bore 20. The expanding mandrel 11 comprises half-mandrels 12, 12' between which a separating wedge 13, which can be acted upon mechanically or hydraulically, is arranged for producing a breaking force acting transversely with respect to the separating areas 8, 8'.

As clearly shown in tests, the pairs of corresponding fracture separating surfaces 14, 14' and 15, 15' of the bear cover 4 and the crankcase 1 or the bearing block 3 are generated in a perfect manner by means of the expanding mandrel 11 in separating areas 8, 8' which enclose an obtuse angle $\alpha$ having a case-side vertex 10 with one another if the curvature radius $R_{SD}$ of the half-mandrel 12', as a function of the respective obtuse angle $\alpha$, is selected to be by 0.5%–5.%, preferably 0.5%–1.5%, in the case of a large obtuse angle ($\alpha$), smaller than the constant curvature radius $R_L$ of the bearing bore 20 receiving the half-mandrel 12'. By means of a half-mandrel 12' of the expanding mandrel 11 which is adapted according to the invention, fracture separating surfaces 14, 14' and 15, 15' extending at an obtuse angle $\alpha$ are reliably obtained in separating areas 8, 8' constructed correspondingly according to the invention. For this purpose, a variable curvature radius $R_{SD}$ for the half-mandrel 12' in the area of the support in the bearing bore 20 may also be advantageous.

By means of the invention, it is therefore possible, in the case of a crankcase with cylinders arranged in a V-shape, to separate bearing covers 4 by means of a fracture from the case 1 in order to achieve fracture separating surfaces 14, 14' and 15, 15' which correspond in an accurately fitting manner for the repeatable joining of the bearing cover 4 with the case 1 without any additional fitting devices.

In order to avoid a bending fracture which disadvantageously affects the quality of the fracture separating surfaces 14, 14' or 15, 15' during the fracture separating of the bearing cover 4 in the last-breaking separating area 8 or 8' close to one of the clearances 5, the bearing cover 4 is guided during the whole fracture separating operation in a known manner without any rotations.

Instead of the separating wedge 13, a hydraulic piston-cylinder unit may also be used between the half-mandrels 12, 12', which piston-cylinder unit is known from U.S. Pat. No. 4,754,906 for generating a fracture separating force in a bearing arrangement.

As also shown in the figure, the bearing cover 4 is fixed on the crankcase 1 or on the bearing block 3 by means of screw bolts 16. The screw arrangement is such that bores 17, 18 receiving the screw bolts 16 are arranged in the case 1 and the bearing cover 4 in that they are sloped with respect to the pairs of fracture separating surfaces 14, 14' and 15, 15' in such a manner—angle $\beta$—that, in the mutually braced fracture separating surfaces 14, 14' and 15, 15', pushing forces resulting from the bracing of the bearing cover counteract the engine unit pushing forces effective in the bearing bore 20. This screw arrangement advantageously prevents damage, which may be caused by dynamic transverse stress, to the fracture structure of the fracture separating surfaces 14, 14' and 15, 15' causing a fitting of the corresponding fracture surfaces. As a result, a high operational reliability of the bearing cover arrangement is achieved.

The fracture separating process according to the invention may advantageously also be used in the case of an engine unit or crankcase made a light-metal alloy, particularly with separating areas constructed by means of fiber inserts.

In addition to being used in the case of engine units, the process according to the invention may, for example, also be used in the case of connecting rods, particularly for piston engines.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for fracture separating the bearing cover of a multi-part bearing arrangement, particularly in crankcases of internal-combustion engines, in which a bearing cover which is integrally connected with a part of the bearing arrangement by way of fastening flanges is separated by means of a half-mandrel which can be stressed essentially abruptly and rests in the cover-side bearing bore section, for generating fracture separating surfaces, which correspond in an accurately fitting manner, in separating areas of the fastening flanges which are prepared by means of a cross-sectional change and/or a treatment of the material, characterized in that the pairs of corresponding fracture separating surfaces of the bearing cover and the remaining part of the bearing arrangement are generated in separating areas which together enclose an obtuse angle ($\alpha<180°$) by means of at least one half-mandrel whose curvature radius ($R_{SD}$) in the area of the support in the bearing bore is selected as a function of the respective obtuse angle ($\alpha$) by 0.5% to 5% smaller than the constant curvature radius ($R_L$) of the bearing bore receiving the half-mandrel.

2. Process according to claim 1, characterized in that a variable curvature radius ($R_{SD}$) is selected for the half-mandrel.

3. Process according to claim 1, characterized in that the curvature radius ($R_{SD}$) of the half-mandrel, in the case of a relatively large angle ($\alpha$), is selected to be by 0.5% to 1.5% smaller.

4. Process according to claim 3, characterized in that a variable curvature radius ($R_{SD}$) is selected for the half-mandrel.

5. Process according to claim 1, characterized in that another half-mandrel is assigned to the half-mandrel for fracture separating the bearing cover in the bearing bore by means of a separating wedge, for causing a fracture separating force generated by means of the thus formed expanding mandrel in the bearing bore.

6. Process according to claim 5, characterized in that the separating areas are formed by steps arranged at least on one front side of the bearing arrangement by means of a removal of material, which steps are connected with notches arranged in the bearing bore.

7. Process according to claim 5, characterized in that the separating areas are formed by groove-type indentations arranged at least on one front side of the bearing arrangement, which indentations are connected with notches arranged in the bearing bore.

8. Process according to claim 1, characterized by the use in the case of a bearing arrangement made of a light-metal alloy, fiber inserts being optionally provided in the separating areas.

9. Process according to claim 1, characterized in that the bearing-cover-side half-mandrel is connected with a device arranged outside the bearing arrangement, for the step-by-step effect of a prestressing force and of a fracture separating force.

10. Bearing arrangement according to claim 1, having a bearing cover which can be fixed by screw bolts, characterized in that bores receiving the screw bolts are arranged in the bearing arrangement being sloped with respect to the pairs of fracture separating surfaces in such a manner (angle $\beta$)

that, in the mutually braced fracture separating surfaces, pushing forces resulting from the bracing of the bearing cover counteract the engine unit pushing forces acting in the bearing bore.

11. Process according to claim 1, characterized in that the separating areas are formed by steps arranged at least on one front side of the bearing arrangement by means of a removal of material, which steps are connected with notches arranged in the bearing bore.

12. Process according to claim 1, characterized in that the separating areas are formed by groove-type indentations arranged at least on one front side of the bearing arrangement, which indentations are connected with notches arranged in the bearing bore.

13. Process according to claim 1, characterized by the use in the case of a bearing arrangement made of an iron material, particularly in the case of engine units or crankcases made of a cast-iron material.

14. Method of manufacturing an internal combustion engine crankcase of the type having a bearing bore surrounded by a bearing block and a bearing cover detachably connected to the bearing block, comprising:

casting a bearing block with a bearing bore and bearing cover sections bounding one side of the bearing bore, treating said bearing block to form predetermined intersecting separation planes for the bearing cover sections, said planes being disposed at a predetermined obtuse angle with respect to one another, providing a mandrel part having a curvature radius which is between 0.5% and 5% smaller than a constant curvature radius of the bearing bore, inserting the mandrel part in the bearing bore and abruptly forcing the mandrel part in a radial direction with respect to the bearing bore to fracture separate the bearing cover sections from the bearing block.

* * * * *